United States Patent
Okuda

(10) Patent No.: US 8,593,254 B2
(45) Date of Patent: Nov. 26, 2013

(54) SEMICONDUCTOR INTEGRATED CIRCUIT, CARD COMPRISING THE SAME, AND OPERATING METHOD OF SEMICONDUCTOR INTEGRATED CIRCUIT

(75) Inventor: Yuichi Okuda, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 1252 days.

(21) Appl. No.: 12/122,870

(22) Filed: May 19, 2008

(65) Prior Publication Data

US 2008/0315995 A1 Dec. 25, 2008

(30) Foreign Application Priority Data

Jun. 20, 2007 (JP) ................................ 2007-162213

(51) Int. Cl.
- H04Q 5/22 (2006.01)
- G08B 13/14 (2006.01)
- G06K 19/06 (2006.01)
- H02M 7/00 (2006.01)
- H02M 3/06 (2006.01)
- H02M 3/18 (2006.01)
- H01Q 1/48 (2006.01)

(52) U.S. Cl.
USPC ............. 340/10.1; 340/10.51; 340/572.7; 340/572.3; 340/10.3; 340/568.1; 235/492; 363/59; 363/62; 343/846; 307/109; 307/110

(58) Field of Classification Search
USPC ............. 340/10.1, 10.3, 572.1, 572.4, 568.1, 340/539.1, 825.69, 825.72, 571.1, 573.1, 340/10.2; 343/846, 848, 850, 853; 455/75, 455/77, 78, 87
See application file for complete search history.

(56) References Cited

U.S. PATENT DOCUMENTS

| | | | |
|---|---|---|---|
| 6,169,673 B1 * | 1/2001 | McIntyre et al. | 363/59 |
| 6,639,459 B1 * | 10/2003 | Devilbiss | 329/341 |
| 2003/0142759 A1 * | 7/2003 | Anderson et al. | 375/298 |
| 2003/0183699 A1 * | 10/2003 | Masui | 235/492 |
| 2006/0049917 A1 * | 3/2006 | Hyde et al. | 340/10.4 |
| 2006/0197668 A1 * | 9/2006 | Oliver et al. | 340/572.4 |
| 2006/0238301 A1 * | 10/2006 | Wu et al. | 340/10.1 |
| 2007/0057797 A1 * | 3/2007 | Waldner et al. | 340/572.7 |
| 2007/0096881 A1 * | 5/2007 | Pillai | 340/10.51 |
| 2007/0206705 A1 * | 9/2007 | Stewart | 375/316 |

FOREIGN PATENT DOCUMENTS

| | | |
|---|---|---|
| CN | 1111850 A1 | 11/1995 |
| CN | 1710780 A | 12/2005 |

OTHER PUBLICATIONS

Hiroyuki Nakamoto et al, "A Passive UHF RF Identification CMOS Tag IC Using Ferroelectric RAM in 0.35-μm Technology", IEEE Journal of Solid-State Circuits, vol. 42, No. 1, Jan. 2007, pp. 101-109.

* cited by examiner

Primary Examiner — Jennifer Mehmood
Assistant Examiner — Mirza Alam
(74) Attorney, Agent, or Firm — Mattingly & Malur, PC

(57) ABSTRACT

A semiconductor integrated circuit has a rectifying circuit, a switched capacitor, a switched-capacitor drive circuit, a demodulator, and an internal circuit. The switched capacitor executes series charging and parallel discharging to/from a plurality of capacitors using an output rectified voltage. When the current driving performance at the time of supplying a power source voltage is set to a high state, so that a receiving operation in a card is executed reliably even at a long communication distance. Transmission signal data from a card is supplied to a switched-capacitor current driving performance increase disable circuit, and the current driving performance at the time of supplying the power source voltage in the switched capacitor is changed to be low. The change is detected as a magnetic field change in an antenna by an apparatus.

12 Claims, 7 Drawing Sheets

SEMICONDUCTOR INTEGRATED CIRCUIT, CARD COMPRISING THE SAME, AND OPERATING METHOD OF SEMICONDUCTOR INTEGRATED CIRCUIT

CROSS-REFERENCE TO RELATED APPLICATIONS

The disclosure of Japanese Patent Application No. 2007-162213 filed on Jun. 20, 2007 including the specification, drawings and abstract is incorporated herein by reference in its entirety.

BACKGROUND OF THE INVENTION

The present invention relates to a semiconductor integrated circuit, a card including the semiconductor integrated circuit, and an operating method of the semiconductor integrated circuit. More particularly, the invention relates to a technique effective to make a semiconductor integrated circuit reliably operate even when a communication distance is long.

An IC card having no power supply is being spread and used in various fields such as an automatic ticket gate system, electronic money, and physical distribution management. Power is supplied to the IC card by receiving an RF signal from a reader/writer called a card reader/card writer by an antenna coil of the IC card and rectifying the RF signal by a rectifying circuit. The IC card is called an RFID card for the reason that an RF signal is supplied to the IC card and unique identification (ID) information is stored in a built-in nonvolatile memory.

Non-patent document 1 describes an RFID CMOS tag IC attached to a commodity. The tag IC includes a CMOS full-wave rectifying circuit, a band-gap reference voltage circuit, a booster circuit, an overcurrent protection circuit, a reception demodulator, a transmission modulator, a clock generation voltage control oscillator, a transmission/reception control logic, and a nonvolatile memory. The CMOS full-wave rectifying circuit generates an internal supply voltage VDD from a UHF carrier wave emitted from a reader/writer, and the booster circuit supplies an operation supply voltage to a ferroelectric RAM as a nonvolatile memory.

Non-patent document 1
Hiroyuki Nakamoto et al, "A Passive UHF RF Identification CMOS Tag IC Using Ferroelectric RAM in 0.35-v Technology", IEEE Journal of Solid-State Circuits, Vol. 42, No. 1, January 2007, pp. 101 to 109

SUMMARY OF THE INVENTION

Prior to the present invention, the inventors of the present invention have engaged in development of an RF secure microcontroller to be mounted on an RFID card.

FIG. 1 is a diagram showing an RFID card on which an IC chip of an RF secure microcontroller developed by the inventors herein prior to the present invention is mounted. To the RFID card of FIG. 1, an RF signal of 13.56 MHz in an ISM (Industry-Science-Medical) frequency band from the card reader/card writer is supplied. The RFID card has an antenna coil ANT for receiving the RF signal of 13.56 MHz. One end LA of the antennal coil ANT and the other end LB are coupled to inputs of a full-wave rectifying circuit in an IC chip IC of an RF secure microcontroller.

The IC chip IC includes a full-wave rectifying circuit D1, D2, D3, and D4, a load modulator Ld_Mod, a shunt regulator Sh_Reg, a central processing unit CPU, and a nonvolatile memory unit NVMU. The IC chip IC also includes a smoothing capacitor C1, overvoltage protection diodes D7 to D12, diodes D5 and D6, an ASK demodulator ASK_Demod, and a clock generator Clk_Gen.

The one end LA of the antenna coil ANT is coupled to the anode of a rectifying device D1 in the full-wave rectifying circuit and the cathode of a rectifying device D3. The other end LB of the antenna coil ANT is coupled to the anode of a rectifying device D2 in the full-wave rectifying circuit and the cathode of a rectifying device D4. The anodes of the rectifying devices D3 and D4 in the full-wave rectifying circuit are coupled to a ground voltage. A rectified output voltage from the cathodes of the rectifying devices D1 and D2 is used as an operation power source voltage of the internal circuit in the IC chip IC. To reduce fluctuations in the operation power source voltage caused by a change in the distance between the card reader/card writer and the RFID card, the shunt regulator Sh_Reg is disposed. The shunt regulator Sh_Reg includes resistors R1, R2, and R3, an error amplifier EA, and a control transistor Qn1. The fluctuation in the operation power source voltage transmitted to the connection node of the voltage-dividing resistors R2 and R3 is supplied to a non-inverting input terminal of the error amplifier EA, and a reference voltage Vref is supplied to an inverting input terminal of the error amplifier EA. An output voltage of the error amplifier EA is supplied to the control gate input terminal of the control transistor Qn1. When a detection voltage at the connection node of the voltage-dividing resistors R2 and R3 becomes higher than the reference voltage Vref, the output voltage of the error amplifier EA rises. A drop voltage in the resistor R1 caused by drain current in the control transistor Qn1 increases, and the detection voltage at the connection node of the voltage-dividing resistors R2 and R3 decreases. By the negative feedback control, an output voltage of the shunt regulator Sh_Reg can be maintained to an almost stable voltage.

The RF signal voltages of opposite polarities at both ends LA and LB of the antenna coil ANT are supplied to the clock generator Clk_Gen, and a clock signal generated from the clock generator Clk_Gen is supplied to the central processing unit CPU. The RF signal voltages of the opposite polarities at both ends LA and LB of the antenna coil ANT are supplied to the ASK demodulator ASK_Demod via the diodes D5 and D6. An ASK modulation signal from the card reader/card writer to the RFID card can be demodulated by the ASK demodulator ASK_Demod. ASK is an abbreviation of "Amplitude Shift Keying". Transmission/reception is carried out by amplitude modulation and demodulation. Transmission from the central processing unit CPU in the RFID card to the card reader/card writer is executed by the load modulator Ld_Mod. The load modulator Ld_Mod includes the transistor Qn2 as a load switch device and the resistor R4 for current limitation. In response to the transmission signal from the RFID card to the card reader/card writer, current flowing in the transistor Qn2 as the load switch device changes. The change in the current in the load switch device Qn2 is transmitted to the antenna coil ANT via the full-wave rectifying circuit D1, D2, D3, and D4. The change in the current of the antenna coil ANT can be detected as a change in the magnetic field of the antenna coil ANT by the card reader/card writer.

However, at the stage of examining applications of the RFID card including the IC chip of the RF secure microcontroller in various fields, the following problems were revealed.

One of the problems is that current taken from the antenna coil of the RFID card sharply drops due to increase in the distance between the card reader/card writer and the RFID card. Table 1 shows changes in voltage V, output resistance R, and output maximum current I caused by changes in a distance D between the card reader/card writer and the RFID card in the case where the antenna coil ANT is expressed by an equalization power supply.

TABLE 1

| D[mm] | V[V] | R[kΩ] | I[mA] |
|---|---|---|---|
| 0 | 11 | 0.2 | 55.0 |
| 6 | 18 | 0.4 | 45.0 |
| 10 | 21 | 0.4 | 52.5 |
| 20 | 31 | 0.6 | 51.7 |
| 25 | 37 | 0.7 | 52.9 |
| 30 | 43 | 1 | 43.0 |
| 40 | 58 | 1.8 | 32.2 |
| 50 | 69 | 3.1 | 22.3 |
| 60 | 74 | 4.8 | 15.4 |
| 70 | 72 | 6.3 | 11.4 |
| 80 | 63 | 7.5 | 8.4 |
| 90 | 53 | 8.3 | 6.4 |
| 100 | 43 | 8.5 | 5.1 |
| 110 | 35 | 8.8 | 4.0 |
| 120 | 29 | 9.1 | 3.2 |
| 130 | 24 | 9.2 | 2.6 |

It is understood from Table 1 that when the distance D exceeds 100 mm (10 cm), the value of the output maximum current I decreases to 5.1 mA or less. Therefore, due to increase in the distance D, the current taken from the antenna coil sharply drops. In particular, in the applications of an automatic ticket gate system, electronic money, and the like, a number of users place their RFID cards close to the card reader/card writer for a short time so that data is read/written. It is therefore desirable that even when the distance between the card reader/card writer and the RFID card exceeds 100 mm, the RFID operates reliably.

The RFID card of FIG. 1 has another problem such that a change in the magnetic field of the antenna coil ANT caused by the current change in the transistor Qn2 as the load switch device responding to a transmission signal to the card reader/card writer is reduced by the shunt regulator Sh_Reg. Specifically, due to a drop in the rectified output voltage from the cathodes of the rectifying devices D1 and D2 in the full-wave rectifying circuit caused by current increase in the transistor Qn2 as the load switch device, the detection voltage of the connection node between the voltage-dividing resistors R2 and R3 of the shunt regulator Sh_Reg drops. Then, the output voltage of the error amplifier EA drops, and the drain current of the control transistor Qn1 also drops. Therefore, the sum between current in the transistor Qn2 as the load switch device from the cathodes of the rectifying devices D1 and D2 in the full-wave rectifying circuit and the drain current of the control transistor Qn1 of the shunt regulator Sh_Reg becomes almost constant. As a result, a problem occurs such that a change in the current of the antenna coil ANT decreases, a detection signal of the card reader/card writer as a magnetic field change in the antenna coil ANT decreases, and a read error occurs in the reader/writer.

The present invention has been achieved by the above-described examination of the inventors of the present invention prior to the present invention. An object of the present invention is to provide a semiconductor integrated circuit to be mounted on a card, which can reliably operate even when a communication distance becomes long. Another object of the invention is to provide a semiconductor integrated circuit to be mounted on a card, capable of reducing a read error in a reader/writer.

The above and other objects and novel features of the present invention will become apparent from the description of the specification and the appended drawings.

Representative ones of inventions disclosed in the application will be briefly described as follows.

A representative semiconductor integrated circuit of the invention has a rectifying circuit, a switched capacitor, a switched-capacitor drive circuit, a demodulator, and an internal circuit. The switched capacitor executes series charging to a plurality of capacitors using the output rectified voltage supplied from the rectifying circuit and parallel discharging from the plurality of capacitors. The current driving performance of the switched capacitor at the time of supplying a power source voltage to the demodulator and the internal circuit is set to a high state (refer to FIG. 2).

Effects obtained by the representative ones of the inventions disclosed in the application are briefly described as follows. The present invention can provide a semiconductor integrated circuit to be mounted on a card, which can reliably operate even when a communication distance becomes long.

DETAILED DESCRIPTION OF THE PREFERRED EMBODIMENTS

Representative Embodiments

Figure 1:
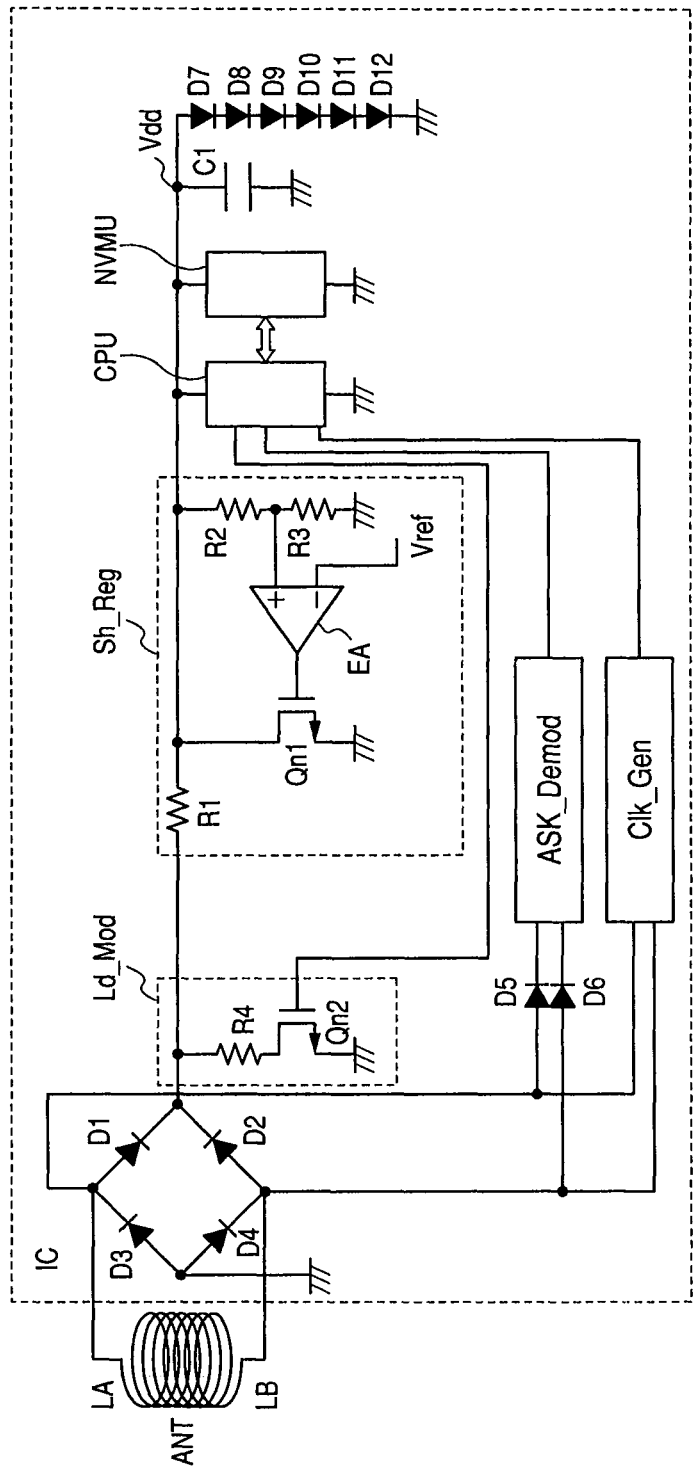
FIG. 1 is a diagram showing an RFID card on which an IC chip of an RF secure microcontroller developed by the inventors herein prior to the present invention is mounted.

First, an outline of representative embodiments of the present invention disclosed in this application will be described. Reference numerals in the drawings in parentheses in the description of the outline of the representative embodiment just illustrate the concept of the components.

[1] A semiconductor integrated circuit (IC) as a representative embodiment of the present invention has a rectifying circuit (D1 to D4), switched capacitors (SC1 and SC2), switched-capacitor drive circuits (SC_DR1 and SC_DR2), a demodulator (ASK_Demod), and internal circuits (CPU and NVMU).

An RF reception signal from a reader/writer is supplied to the rectifying circuit.

An output rectified voltage (Vout) from the rectifying circuit is supplied to the switched capacitors.

The switched-capacitor drive circuits generate switch control signals (Ckt1, Ckb1, Ckt2, or Ckb2) responding to the RF reception signal to drive the switched capacitors by the switch control signals.

The demodulator demodulates a modulated signal included in the RF reception signal and supplies the generated demodulation signal to the internal circuits.

By executing series charging to a plurality of capacitors (C11, C12; C21, C22) using the output rectified voltage supplied from the rectifying circuits and parallel discharging from the plurality of capacitors in response to the switch control signals from the switched-capacitor drive circuits, current driving performance of the switched capacitors at the time of supplying a power source voltage (Vdd) to the demodulator and the internal circuits is set to a high state (refer to FIG. 2).

In the embodiment, at the time of supplying the power source voltage to the demodulator and the internal circuits, large drive current by the parallel discharging from the plurality of capacitors can be supplied. Therefore, even when a drop in current from the antenna coil of the RFID card occurs due to increase in a communication distance to the reader/writer, large drive current obtained by the parallel discharging from the plurality of capacitors can be supplied to the demodulator and the internal circuits. As a result, even when the communication distance increases, the demodulator can execute reliable demodulating operation, and the internal circuits can reliably process the demodulation signal supplied from the demodulator.

In a preferred embodiment of the invention, the semiconductor integrated circuit further includes switched-capacitor current driving performance increase disable circuits (SC_dis1 and SC_dis2).

The internal circuits generate transmission signal data (Tx-Data) and supplies the transmission signal data to the switched-capacitor current driving performance increase disable circuits.

In response to the transmission signal data, the switched-capacitor current driving performance increase disable circuits control the current driving performance at the time of supplying the power source voltage of the switched capacitors to be lower than the high state.

In the preferred embodiment, a fluctuation in the current driving performance at the time of supplying the power source voltage responding to the transmission signal data is a fluctuation in the effective load of the rectifying circuit. A fluctuation in the effective load of the rectifying circuit is reliably detected as a change in the magnetic field of the antenna coil of the RFID card by the reader/writer. Thus, a read error in the reader/writer can be reduced.

In a semiconductor integrated circuit of a more preferred embodiment, the switched capacitors include first and second switched capacitors (SC1 and SC2) for alternately parallel-executing capacitor charging and capacitor discharging.

In the more preferred embodiment, by the parallel execution, a ripple component in the power source voltage supplied to the demodulator and the internal circuits can be reduced.

In a semiconductor integrated circuit of a further more preferred embodiment, the rectifying circuit is a full-wave rectifying circuit (D1 to D4) to which a pair of RF reception signals of opposite polarities from the reader/writer are supplied.

In the semiconductor integrated circuit as a concrete embodiment, the demodulator includes a low-pass filter (LPF), a high-pass filter (HPF), a decoder (Decoder), and an output logic latch (OLL). The output rectified voltage from the full-wave rectifying circuit is supplied to an input of the low-pass filter in the demodulator. An output signal of the low-pass filter is supplied to an input of the high-pass filter. The decoder outputs a discriminative output signal (Q, /Q) indicative of a magnitude relation between voltages at both ends of an output resistor (R6) in the low-pass filter. The output logic latch generates a demodulated output signal (Dout) in response to the discriminate output signal from the decoder (refer to FIGS. 6 and 7).

[2] A card as a representative embodiment from another viewpoint of the present invention includes: an antenna (ANT) to which an RF reception signal from a reader/writer is supplied and which transmits an RF transmission signal to the reader/writer; and a semiconductor integrated circuit (IC).

The semiconductor integrated circuit includes a rectifying circuit (D1 to D4), switched capacitors (SC1 and SC2), switched-capacitor drive circuits (SC_DR1 and SC_DR2), a demodulator (ASK_Demod), and internal circuits (CPU and NVMU).

The RF reception signal from the antenna is supplied to the rectifying circuit.

An output rectified voltage (Vout) from the rectifying circuit is supplied to the switched capacitors.

The switched-capacitor drive circuits generated switch control signals (Ckt1, Ckb1, Ckt2, or Ckb2) responding to the RF reception signal to drive the switched capacitors by the switch control signals.

The demodulator demodulates a modulated signal included in the RF reception signal and supplies the generated demodulation signal to the internal circuits.

The switched capacitors execute series charging to a plurality of capacitors (C11, C12; C21, C22) using the output rectified voltage supplied from the rectifying circuit and parallel discharging from the plurality of capacitors in response to the switch control signals from the switched-capacitor drive circuits. By the execution, current driving performance of the switched capacitors at the time of supplying a power source voltage (Vdd) to the demodulator and the internal circuits is set to a high state (refer to FIG. 2).

[3] A method of operating a semiconductor integrated circuit as a representative embodiment from further another aspect of the present invention includes a preparation step of preparing a semiconductor integrated circuit (IC) and an antenna (ANT).

The antenna receives an RF reception signal from a reader/writer and transmits an RF transmission signal to the reader/writer, The semiconductor integrated circuit includes a rectifying circuit (D1 to D4), switched capacitors (SC1 and SC2), switched-capacitor drive circuits (SC_DR1 and SC_DR2), a demodulator (ASK_Demod), and internal circuits (CPU and NVMU).

The RF reception signal from the antenna can be supplied to the rectifying circuit.

An output rectified voltage (Vout) from the rectifying circuit can be supplied to the switched capacitors.

The switched-capacitor drive circuits generate switch control signals (Ckt1, Ckb1, Ckt2, Ckb2) responding to the RF reception signal in the antenna and can drive the switched capacitors by the switch control signals.

The demodulator can supply a demodulation signal generated by demodulating a modulated signal included in the RF reception signal to the internal circuits.

The method of operating the semiconductor integrated circuit includes a coupling step of coupling the semiconductor integrated circuit and the antenna.

The switched capacitors execute series charging to a plurality of capacitors (C11, C12; C21, C22) using the output rectified voltage supplied from the rectifying circuit and parallel discharging from the plurality of capacitors in response to the switch control signals from the switched-capacitor drive circuits responding to the RF reception signal in the antenna. By the execution, current driving performance of the switched capacitors at the time of supplying a power source voltage (Vdd) to the demodulator and the internal circuits is set to a high state.

The method of operating a semiconductor integrated circuit according to a preferred embodiment of the invention further includes a changing step of changing the current driving performance at the time of supplying the power source voltage of the switched capacitors to be lower than the high state by making the switched capacitors respond to transmission signal data (TxData) generated by the internal circuits.

DESCRIPTION OF EMBODIMENTS

Figure 2:
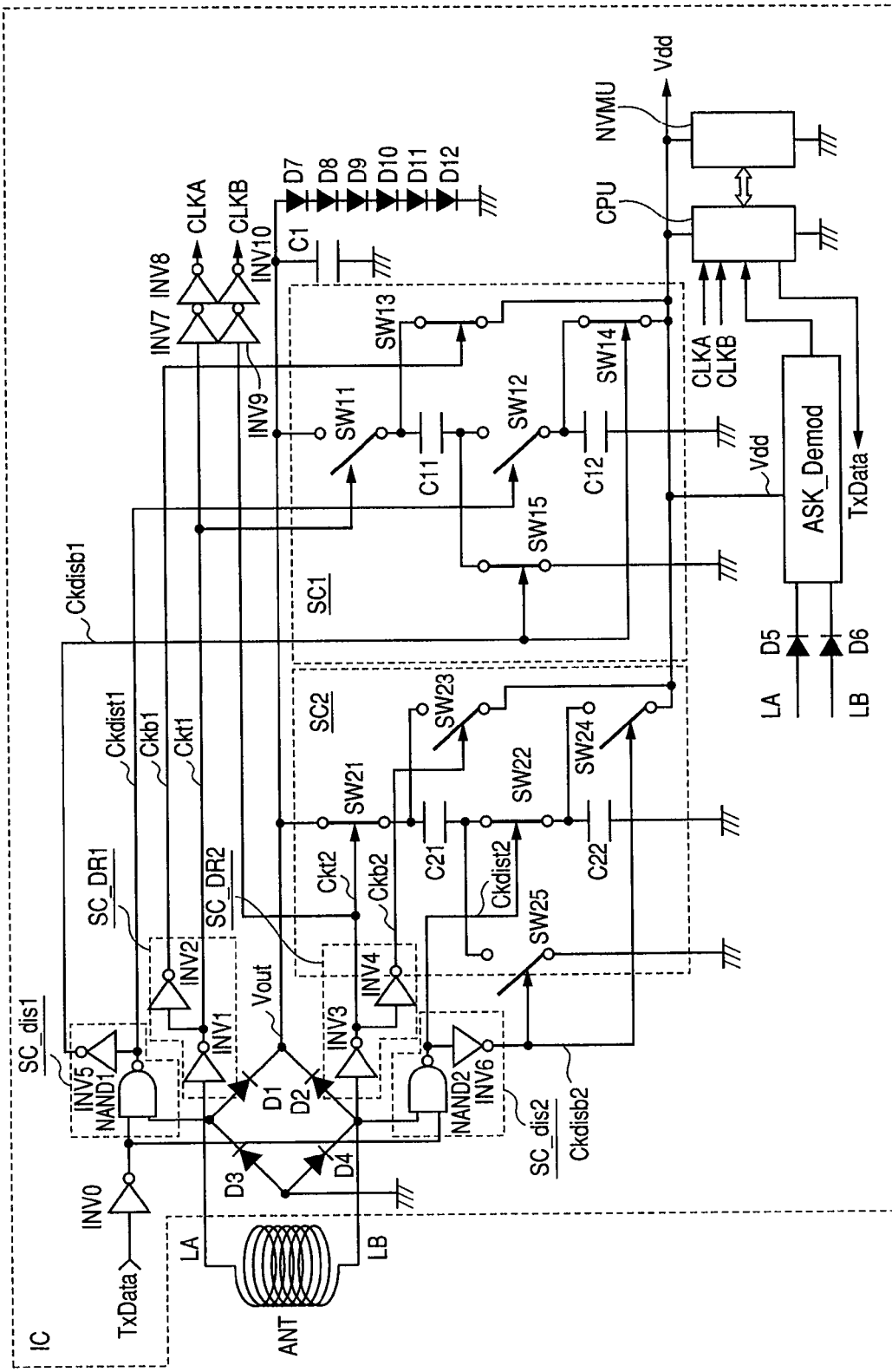
FIG. 2 is a diagram showing the configuration of an IC chip of an RF secure microcontroller as an embodiment of the invention to be mounted on an RFID card.

The embodiments will be described in more detail.
Configuration of IC Chip of RF Secure Microcontroller FIG. 2 is a diagram showing the configuration of an IC chip of an RF secure microcontroller as an embodiment of the invention, to be mounted on an RFID card. To the RFID card in FIG. 2, an RF signal of 13.56 MHz in an ISM frequency band from a card reader/card writer is supplied. The RFID card has an antenna coil ANT for receiving an RF signal of 13.56 MHz. One end LA and the other end LB of the antenna coil ANT are coupled to inputs of a full-wave rectifying circuit in an IC chip IC of the RF secure microcontroller.

The IC chip IC in FIG. 2 includes a full-wave rectifying circuit D1, D2, D3, and D4, a first switched capacitor SC1, a second switched capacitor SC2, a central processing unit CPU, and a nonvolatile memory unit NVMU. The central processing unit CPU can encipher unique identification information of the RFID card and a password of the user and write data to the nonvolatile memory unit NVMU. The central processing unit CPU can decipher the enciphered data written in the nonvolatile memory unit NVMU and use it for electronic settlement and the like. The IC chip IC includes a first switched-capacitor drive circuit SC_DR1, a second switched-capacitor drive circuit SC_DR2, a first switched-capacitor current driving performance increase disable circuit SC_dis1, and a second switched-capacitor current driving performance increase disable circuit SC_dis2. The IC chip IC further includes a smoothing capacitor C1, overvoltage protection diodes D7, D8, D9, D10, D11, and D12, diodes D5 and D6, and an ASK demodulator ASK_Demod.

To the full-wave rectifying circuit D1, D2, D3, and D4, an RF reception signal of 13.56 MHz from the card reader/card writer is supplied via the antenna coil ANT. To the first and second switched capacitors SC1 and SC2, an output rectified voltage Vout from the full-wave rectifying circuit D1, D2, D3, and D4 is supplied. The first and second switched-capacitor drive circuits SC_DR1 and SC_DR2 generate switch control signals Ckt1, Ckb1, Ckt2, and Ckb2 responding to the RF reception signal, and drive the first and second switched capacitors SC1 and SC2 on the basis of the switched control signals Ckt1, Ckb1, Ckt2, and Ckb2. The ASK demodulator ASK_Demod supplies an ASK demodulation signal generated by demodulating the ASK modulation signal included in the RF reception signal received by the antenna coil ANT to the central processing unit CPU in an internal circuit.

In response to the switch control signals Ckt1, Ckb1, Ckt2, and Ckb2 from the switched-capacitor drive circuits SC_DR1 and SC_DR2, the switched capacitors SC1 and SC2 execute series charging to a plurality of capacitors C11, C12, C21, and C22 using the output rectified voltage Vout from the full-wave rectifying circuit D1, D2, D3, and D4 and parallel discharging from the plurality of capacitors C11, C12, C21, and C22. Consequently, in the switched capacitors SC1 and SC2, the current driving capability at the time of supplying a source voltage Vdd to the ASK demodulator ASK_Demod, the central processing unit CPU in the internal circuit, and the nonvolatile memory unit NVMU is set to be high.
Operation of Transmission to Card Reader/Card Writer by IC Chip The IC chip of the RF secure microcontroller further includes the first and second switched-capacitor current driving performance increase disable circuits SC_dis1 and SC_dis2. The central processing unit CPU in the internal circuit generates transmission signal data TxData and supplies the transmission signal data TxData to the switched capacitor current driving performance increase disable circuits SC_dis1 and SC_dis2 via an inverter INV0. In response to the transmission signal data TxData, the switched-capacitor current driving performance increase disable circuits SC_dis1 and SC_dis2 control the current drive capability at the time of supplying the source voltage Vdd in the switched capacitors SC1 and SC2 to be lower than the high state. Fluctuations in the current drive capability at the time of supplying the source voltage Vdd are fluctuations in effective load of the full-wave rectifying circuit D1 to D4. The fluctuations in the effective load of the full-wave rectifying circuit D1 to D4 are reliably detected as a change in the magnetic field of the antenna coil of the RFID card by the card reader/card writer. As a result, a read error in the card reader/card writer can be reduced.

Specifically, in response to an RF signal having one of polarities at the one end LA of the antenna coil ANT, the first switched-capacitor drive circuit SC_DR1 makes the first switched capacitor SC1 execute switching operation. In response to an RF signal of the other polarity at the other end LB of the antenna coil ANT, the second switched-capacitor drive circuit SC_DR2 makes the second switched capacitor SC2 execute switching operation.

In response to the low level "0" of the transmission signal data TxData of the central processing unit CPU, the first and second switched-capacitor current driving performance increase disable circuits SC_dis1 and SC_dis2 allow increase in the current driving performance of the first and second switched capacitors SC1 and SC2 by the control of the first and second switched-capacitor drive circuits SC_DR1 and SC_DR2.

In response to the high level "1" of the transmission signal data TxData of the central processing unit CPU, the first and second switched-capacitor current driving performance increase disable circuits SC_dis1 and SC_dis2 stop increase in the current driving performance of the first and second switched capacitors SC1 and SC2 by the control of the first and second switched-capacitor drive circuits SC_DR1 and SC_DR2.

As described above, the first and second switched capacitors SC1 and SC2 execute increase in the current driving performance of a rectified output from the cathodes of the rectifying devices D1 and D2 of the full-wave rectifying circuit and, on the other hand, stop increase in the current driving performance in response to the transmission signal data TxData from the central processing unit CPU. Therefore, by execution and stop of increase in the current driving performance of the rectified output of the first and second switched capacitors SC1 and SC2, an effective load of the antenna coil ANT fluctuates. As a result, a fluctuation in the effective load of the antenna coil ANT due to a change in the operation of the switched capacitors SC1 and SC2 can be detected as a change in the magnetic field of the antenna coil ANT by the card reader/card writer. In such a manner, by execution and stop of increase in the current driving performance of the rectified output of the switched capacitors SC1 and SC2 according to a change in the level of the transmission signal data TxData, the operation of transmission to the card reader/card writer can be performed.

Parallel Execution of Discharging by Two Switched Capacitors

In response to the RF signals of opposite polarities at both ends LA and LB of the antenna coil ANT, the first and second switched capacitors SC1 and SC2 alternately execute, in parallel, charging with the rectified voltage to the internal capacitors and supply of the power source voltage Vdd to the central processing unit CPU and the nonvolatile memory unit NVMU by discharging from the internal capacitors.

In response to the low level "0" of the transmission signal data TxData from the central processing unit CPU, the first and second switched capacitors SC1 and SC2 alternately parallel-execute the series charging to the two internal capacitors and parallel discharging, thereby increasing the current driving performance. The first and second switched capacitors SC1 and SC2 alternately parallel-execute single charging and single discharging to/from only one internal capacitor in response to the high level "1" of the transmission signal data TxData from the central processing unit CPU, thereby stopping increase in the current driving performance.

By increase in the current driving performance of the first and second switched capacitors SC1 and SC2 and stop of the increase in the current driving performance responding to the low level "0" and the high level "1" of the transmission signal data TxData from the central processing unit CPU, an effective load of the antenna coil ANT fluctuates. A fluctuation in the effective load of the antenna coil ANT due to a change in the operation of the switched capacitors SC1 and SC2 can be detected as a change in the magnetic field of the antenna coil ANT by the card reader/card writer.

Circuit Configuration and Circuit Operation of Switched Capacitor

The first switched capacitor SC1 includes capacitors C11 and C12, a charging switch SW11, a charging control switch SW12, discharging switches SW13 and SW14, and a current driving performance increase control switch SW15. The second switched capacitor SC2 includes capacitors C21 and C22, a charging switch SW21, a charging control switch SW22, discharging switches SW23 and SW24, and a current driving performance increase control switch SW25. The charging switch SW11 and the discharging switch SW13 in the first switched capacitor SC1 are driven by complementary clock signals Ckt1 and Ckb1 from the first switched-capacitor drive circuit SC_DR1. The charging control switch SW12, the discharging switch SW14, and the current driving performance increase control switch SW15 in the first switched capacitor SC1 are driven by the complementary disable control clock signals CKdist1 and CKdisb1 from the first switched-capacitor current driving performance increase disable circuit SC_dis1. The charging switch SW21 and the discharging switch SW23 in the second switched capacitor SC2 are driven by the complementary clock signals Ckt2 and Ckb2 from the second switched-capacitor drive circuit SC_DR2. The charging control switch SW22, the discharging switch SW24, and the current driving performance increase control switch SW25 in the second switched capacitor SC2 are driven by the complementary disable control clock signals Ckdist2 and Ckdisb2 from the second switched-capacitor current driving performance increase disable circuit SC_dis2.

In the case where the transmission signal data TxData is at the low level "0", parallel discharging from the two capacitors C21 and C22 is executed while the two capacitors C11 and C12 are serially charged in the first and second switched capacitors SC1 and SC2. In the next cycle, parallel discharging from the two capacitors C11 and C12 is executed while the two capacitors C21 and C22 are serially charged.

In the case where the transmission signal data TxData is at the high level "1", single discharging from the single capacitor C21 is executed while only one capacitor C11 is singularly charged in the first and second switched capacitors SC1 and SC2. In the next cycle, single discharging from the one capacitor C11 is executed while only one capacitor C21 is singularly charged. Switching between the serial charging and the parallel discharging or between the singular charging and the singular discharging according to a change between the low level "0" and the high level "1" of the transmission signal TxData is executed by the control of the first and second switched-capacitor current driving performance increase disable circuits SC_dis1 and SC_dis2.

Figure 3:
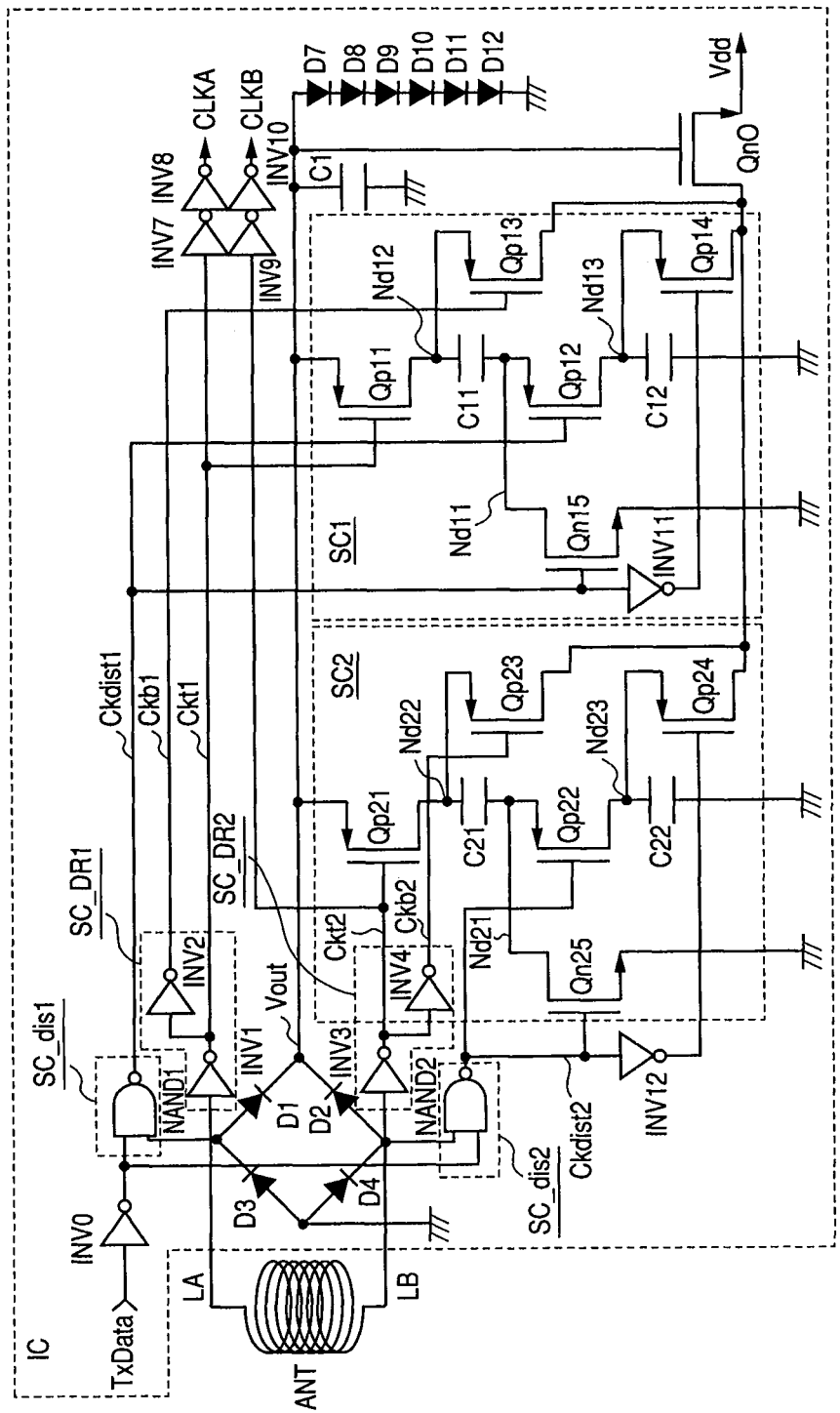
FIG. 3 is a diagram showing the configuration of an IC chip of an RF secure microcontroller as another embodiment of the invention including a switched capacitor having a CMOS configuration.

RF Secure Microcontroller Including Switched Capacitor Having CMOS Configuration FIG. 3 is a diagram showing the configuration of an IC chip of an RF secure microcontroller as another embodiment of the invention including a switched capacitor having a CMOS configuration. Specifically, the switches SW11, SW12, SW13, SW14, and SW15 in the first switched capacitor SC1 in the IC chip of FIG. 2 are comprised by PMOS transistors Qp11, Qp12, Qp13, and Qp14 and an NMOS transistor Qn15 in the IC chip of FIG. 3. The switches SW21, SW22, SW23, SW24, and SW25 in the second switched capacitor SC2 in the IC chip of FIG. 2 are comprised by PMOS transistors Qp21, Qp22, Qp23, and Qp24 and an NMOS transistor Qn25 in the IC chip of FIG. 3. The power source voltage Vdd obtained by discharging from the first and second switched capacitors SC1 and SC2 is supplied from a single output NMOS transistor Qn0 to the central processing unit CPU and the nonvolatile memory unit NVMU.

Circuit Operation in the CMOS Switched Capacitors

Figure 4:
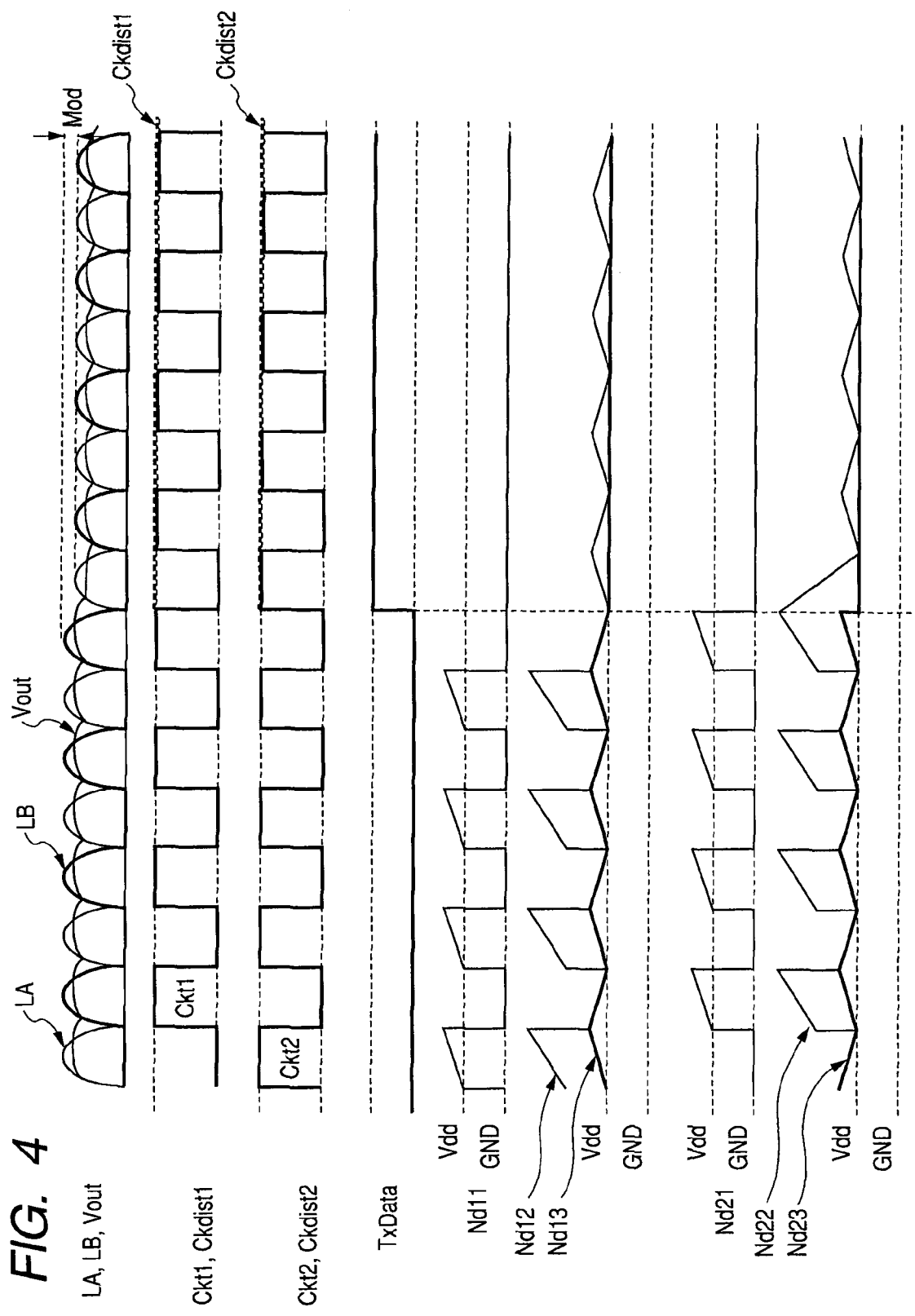
FIG. 4 is a diagram showing waveforms of parts in the IC chip for explaining operations of the IC chip of the RF secure microcontroller illustrated in FIG. 3.

FIG. 4 is a diagram showing waveforms of parts in an IC chip for explaining operations of the IC chip of the RF secure microcontroller illustrated in FIG. 3. The left half of FIG. 4 shows the waveforms in the case where the transmission signal data TxData is the low level "0". The right half of FIG. 4 shows the waveforms in the case where the transmission signal data TxData is the high level "1".

In the case where the transmission signal data TxData is at the low level "0" in the left half of FIG. 4, the clock signal Ckt1 from the first switched-capacitor drive circuit SC_DR1 has almost the same phase as that of an RF signal at the other end LB of the antenna coil ANT. The clock signal Ckt2 from the second switched-capacitor drive circuit SC_DR2 has almost the same phase as that of an RF signal at the one end LA of the antenna coil ANT. In the first switched-capacitor drive circuit SC_DR1, the voltage at a common connection node Nd11 of the two capacitors C11 and C12 changes between an almost power source voltage Vdd and the ground voltage GND. The voltage at a connection node Nd12 of the upper capacitor C11 changes between 2 Vdd which is about twice as high as the power source voltage and 1 Vdd which is almost equal to the power source voltage. The voltage at a connection node Nd13 of the lower capacitor C12 changes around 1 Vdd which is almost equal to the power source voltage. In the second switched-capacitor drive circuit SC_DR2, the voltage at a common connection node Nd21 of the two capacitors C21 and C22 changes between an almost power source voltage Vdd and the ground voltage GND. The voltage at a connection node Nd22 of the upper capacitor C21 changes between 2 Vdd which is about twice as high as the power source voltage and 1 Vdd which is almost equal to the power source voltage. The voltage at a connection node Nd23 of the lower capacitor C22 changes around 1 Vdd which is almost equal to the power source voltage.

In the case where the transmission signal data TxData in the right half of FIG. 4 is at the high level "1", both of disable control clock signals Ckdist1 and Ckdist2 from the first and second switched-capacitor current driving performance increase disable circuits SC_dis1 and SC_dis2 are fixed at the high level "1". Consequently, both of the current driving performance increase control switches SW15 and SW25 are maintained in the on state in the first and second switched capacitors SC1 and SC2, so that the lower capacitors C12 and C22 are not charged during a period of charging the upper capacitors C11 and C21. Therefore, in the first and second switched capacitors SC1 and SC2, the voltages at the common connection nodes Nd11 and Nd21 are maintained at the ground voltage GND. In the first and second switched capacitors SC1 and SC2, the voltages at the connection nodes Nd12, Nd13, Nd22, and Nd23 change around 1 Vdd which is almost equal to the power source voltage.

In the case of the transmission signal TxData of the low level "0" in the left half of FIG. 4, the high-level voltage at the connection nodes Nd12 and Nd22 of the upper capacitors C11 and C21 is increased to a level of 2 Vdd or higher. In the case of the transmission signal data TxData of the high level "1" in the right half of FIG. 4, the high-level voltage at the connection nodes Nd12 and Nd22 of the upper capacitors C11 and C21 is controlled at the level of Vdd. The difference between the high-level voltages of the connection nodes Nd12 and Nd22 of the upper capacitors C11 and C21 becomes an effective load fluctuation in the antenna coil ANT. The effective load fluctuation in the antenna coil ANT causes a fluctuation in the rectified output voltage Vout of the cathodes in the rectifying devices D1 and D2 in the full-wave rectifying circuit. Therefore, an ASK modulation Mod caused by the fluctuation in the rectified output voltage Vout of the cathodes in the rectifying devices D1 and D2 in the full-wave rectifying circuit shown at the top of FIG. 4 can be detected as a change in the magnetic field of the antenna coil ANT by the card reader/card writer.

ASK_Demodulator for Demodulating Data Received from Card Reader/Card Writer

Figure 5:
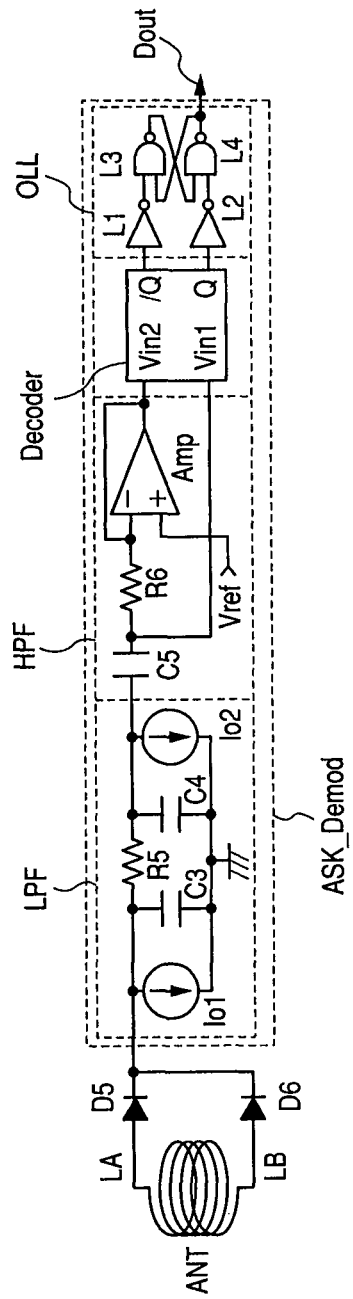
FIG. 5 is a diagram showing the configuration of an ASK demodulator of the IC chip of the RF secure microcontroller illustrated in FIG. 2.

FIG. 5 is a diagram showing the configuration of the ASK demodulator ASK_Demod in the IC chip of the RF secure microcontroller illustrated in FIG. 2. The ASK demodulator in the IC chip is used for demodulating data received from the card reader/card writer. As shown in FIG. 5, RF signal voltages of opposite polarities at both ends LA and LB of the antenna coil ANT are supplied via the diodes D5 and D6 to the ASK demodulator ASK_Demod. An ASK modulated signal from the card reader/card writer to the RFID card can be demodulated by the ASK demodulator ASK_Demod.

The ASK demodulator ASK_Demod shown in FIG. 5 includes a low-pass filter LPF, a high-pass filter HPF, a decoder "Decoder", and an output logic latch OLL. The low-pass filter LPF attenuates RF carrier wave signal components at both ends LA and LB of the antenna coil ANT by including the capacitors C3 and C4 and the resistor R5. Since the low-pass filter LPF is coupled to the antenna coil ANT with the diodes D5 and D6, charges of the low-pass filter LPF are supplied from the antenna coil ANT via the diodes D5 and D6. However, the diodes D5 and D6 cannot discharge the low-pass filter LPF. Therefore, by constant current sources $I_{o1}$ and $I_{o2}$, discharging of the low-pass filter LPF is enabled. Since it is necessary to separate an ASK modulation AC signal component supplied from the card reader/card writer and an operation voltage DC component from each other in order to perform high-precision ASK demodulation, the high-pass filter HPF is coupled to the low-pass filter LPF. The high-pass filter HPF includes the capacitor C5, the resistor R6, and a differential amplifier Amp. An ASK modulation input signal from the low-pass filter LPF is supplied to one end of the capacitor C5. The other and of the capacitor C5 is coupled to one end of the resistor R6 and a first signal input terminal Vin1 of the decoder "Decoder".

The ASK modulation input signal obtained by attenuating the RF carrier wave signal component and separating the DC component by the low-pass filter LPF and the high-pass filter HPF is supplied to the first signal input terminal Vin1 of the decoder "Decoder". To the non-inverting input terminal of the differential amplifier Amp, the DC reference voltage Vref is supplied. On the other hand, the inversion input terminal of the differential amplifier Amp is coupled to the output terminal, the other end of the resistor R6, and a second signal input terminal Vin2 of the decoder "Decoder". As a result, the voltages at the inversion input terminal of the differential amplifier Amp, the output terminal, the other end of the resistor R6, and the second signal input terminal Vin2 of the decoder "Decoder" are maintained almost at the level of the DC reference voltage Vref supplied to the non-inverting input terminal of the differential amplifier Amp.

The ASK modulation input signals obtained at both ends of the resistor R6 in the high-pass filter HPF are supplied to the first and second signal input terminals Vin1 and Vin2 in the decoder "Decoder", thereby generating amplitude change detection pulse signals from an output Q and an inversion output /Q of the decoder "Decoder". By supplying the amplitude change detection pulse signals from the outputs Q and the inversion output /Q of the decoder "Decoder" to the input of the output logic latch OLL, the ASK demodulated output signal Dout is generated from the output of the output logic latch OLL.

More Preferred ASK_Demodulator

Figure 6:
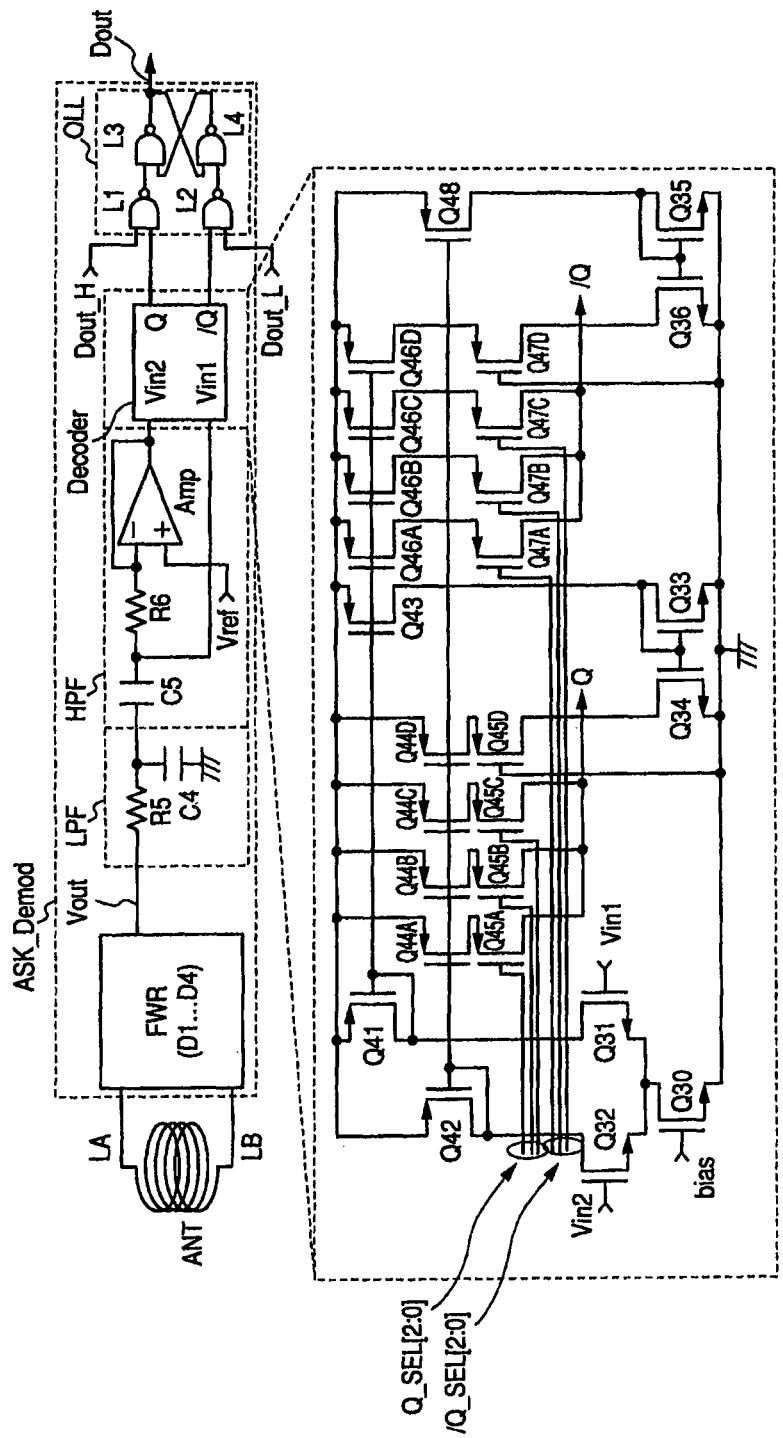
FIG. 6 is a diagram showing the configuration of the ASK demodulator realizing lower power consumption and capable of preventing erroneous operation caused by noise in addition to the functions of the ASK demodulator illustrated in FIG. 5.

FIG. 6 is a diagram showing the configuration of an ASK demodulator capable of realizing lower power consumption than that of the ASK demodulator illustrated in FIG. 5 and preventing erroneous operation caused by noise.

The low-pass filter LPF in the ASK demodulator ASK_Demod shown in FIG. 6 is obtained by eliminating the constant current sources $I_{o1}$ and $I_{o2}$ and the capacitor C3 in the low-pass filter LPF of the ASK demodulator illustrated in FIG. 5. In the low-pass filter LPF in the ASK demodulator ASK_Demod shown in FIG. 6, unlike FIG. 5, one end of the resistor R5 is not coupled to the cathodes in the diodes D5 and D6. The rectified output voltages Vout of the cathodes of the rectifying devices D1 and D2 in a full-wave rectifying circuit FWR (D1, D2, D3, and D4) of FIG. 2 is supplied to the low-pass filter LPF. Therefore, in the ASK demodulator shown in FIG. 6, consumption power due to the constant currents of the constant current sources $I_{o1}$ and $I_{o2}$ of the low-pass filter LPF of the ASK demodulator shown in FIG. 5 can be reduced.

In the ASK demodulator ASK_Demod shown in FIG. 6, an output low-level change prohibit signal Dout_L is generated, which is at the low level "0" for a predetermined period in response to a change from the low level "0" to the high level "1" of the ASK demodulation output signal Dout of the output logic latch OLL. An output high-level change prohibit signal Dout_H is also generated, which is at the low level "0" for a predetermined period in response to a change from the high level "1" to the low level "0" of the ASK demodulation output signal Dout of the output logic latch OLL. The output low-level change prohibit signal Dout_L is supplied to the lower-side input NAND circuit L2 of the output logic latch OLL. On the other hand, the output high-level change prohibit signal Dout_H is supplied to the upper-side input NAND circuit L1 of the output logic latch OLL.

In a lower part of FIG. 6, the circuit of a decoder "Decoder" for generating amplitude change detection pulse signals Q and /Q from signals Vin1 and Vin2 at both ends of the resistor R6 in the high-pass filter HPF is also shown. The signal input terminals Vin1 and Vin2 at both ends of the resistor R6 are coupled to the gates of NMOS transistors Q31 and Q32. To the sources of the NMOS transistors Q31 and Q32, the drain of an NMOS transistor Q30 as a constant current source and having a gate to which a DC bias voltage "bias" is supplied is coupled. PMOS current mirror transistors Q41 and Q43 are coupled to the drain of the NMOS transistor Q31 having a gate coupled to the signal input terminal Vin1, and the NMOS current mirror transistors Q33 and Q34 are coupled to the drain of the PMOS transistor Q43. To the drain of the NMOS transistor Q31 having a gate to which the signal input terminal Vin1 is coupled, other PMOS current mirror transistors Q41, Q46A, Q46B, Q46C, and Q46D are coupled. The gate widths of the PMOS transistors Q46A, Q46B, Q46C, and Q46D are set to have different values. PMOS transistors Q47A, Q47B, Q47C, and Q47D are on/off controlled by a 3-bit selection signal /Q_SEL[2:0]. To the drain of the NMOS transistor Q32 having a gate to which the signal input terminal Vin2 is coupled, PMOS current mirror transistors Q42, Q44A, Q44B, Q44C, and Q44D are coupled. The gate widths of the PMOS transistors Q44A, Q44B, Q44C, and Q44D are set to have different values. PMOS transistors Q45A, Q45B, Q45C, and Q45D are on/off controlled by a 3-bit selection signal Q_SEL[2:0].

When the level of the signal input terminal Vin2 becomes higher than that of the signal input terminal Vin1, pull-up capability of the amplitude change detection pulse signal output terminal Q obtained by the PMOS current mirror transistors Q42, Q44A, Q44B, Q44C, and Q44D becomes higher than pull-down capability of the output terminal Q by the NMOS current mirror transistors Q33 and Q34, and the output terminal Q changes to the high level. The pull-up capability of the output terminal Q can be adjusted by the 3-bit selection signal Q_SEL[2:0]. When the level of the signal input terminal Vin1 becomes higher than that of the signal input terminal Vin2, the pull-up capability of the amplitude change detection pulse signal output terminal /Q obtained by the PMOS current mirror transistors Q41, Q46A, Q46B, Q46C, and Q46D becomes higher than the pull-down capability of the output terminal /Q by NMOS current mirror transistors Q35 and Q36, and the output terminal /Q changes to the high level. The pull-up capability of the output terminal /Q can be adjusted by the 3-bit selection signal Q_SEL[2:0].

Figure 7:
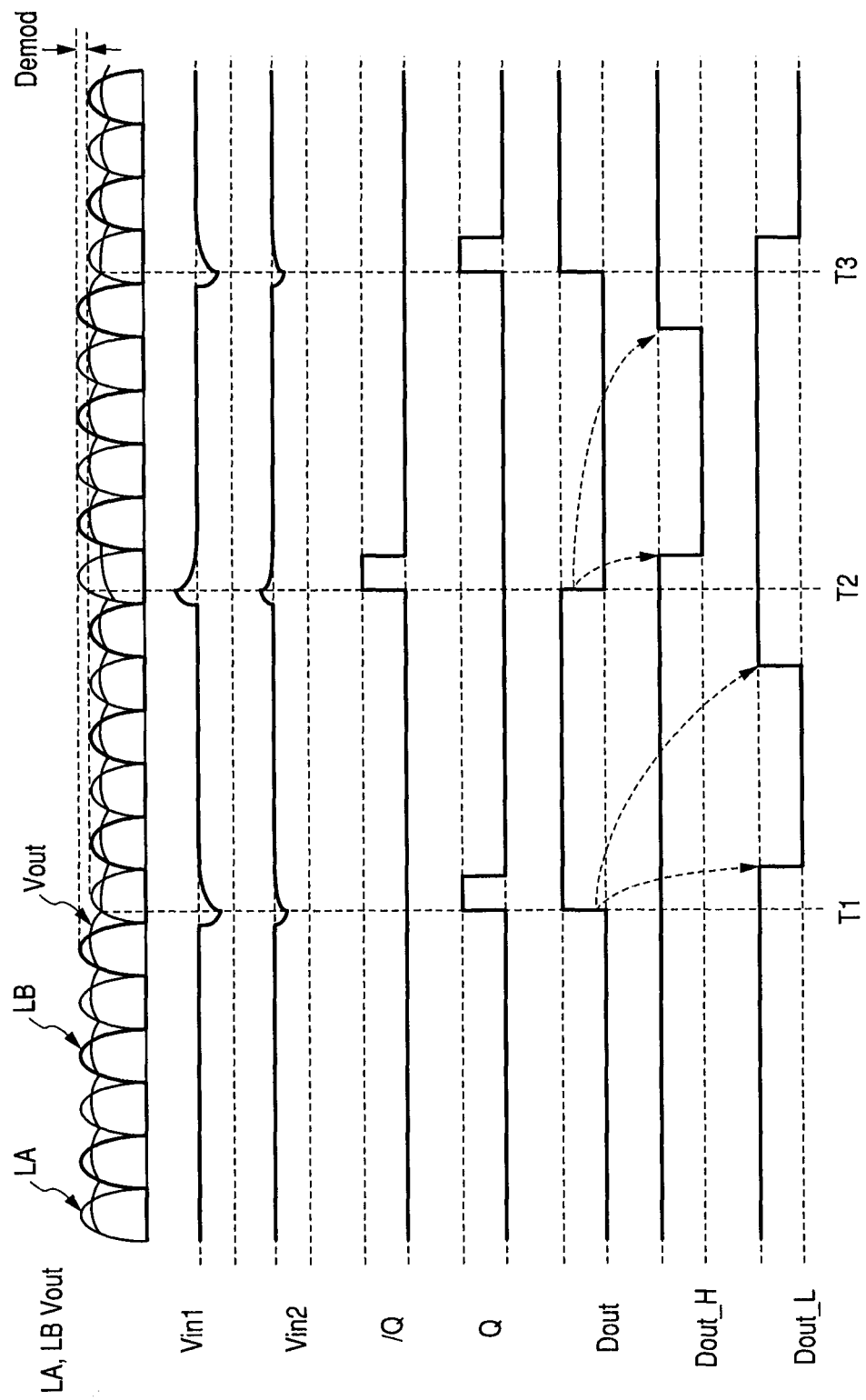
FIG. 7 is a diagram showing waveforms for explaining operations of the ASK demodulator illustrated in FIG. 6.

FIG. 7 is a diagram showing waveforms for explaining the operations of the ASK demodulator illustrated in FIG. 6.

As shown in FIG. 7, before time T1, RF signal amplitude values at both ends LA and LB of the antenna coil ANT are large, and the level of the rectified output voltage Vout of the cathodes of the rectifying devices D1 and D2 in the full-wave rectifying circuit FWR is high. It is assumed that by ASK modulation on the RFID card from the card reader/card writer, the RF signal amplitude values at both ends LA and LB of the antenna coil ANT become smaller and the level of the rectified output voltage Vout becomes lower between the time T1 and time T2. At the time T1, the voltage supplied from one end of the resistor R6 of the high-pass filter HPF to the first signal input terminal Vin1 of the decoder "Decoder" largely drops. On the other hand, the voltage supplied from the other end of the resistor R6 to the second signal input terminal Vin1 of the decoder "Decoder" slightly drops. As a result, the pull-up capability of the amplitude change detection pulse signal output terminal Q becomes higher than the pull-down capability of the output terminal Q, and the output terminal Q changes to the high level. At and before the time T1, the ASK demodulated output signal Dout of the output logic latch OLL is maintained at the low level "0", and the output high-level change prohibit signal Dout_H and the output low-level change prohibit signal Dout_L are maintained at the high level "1". When the amplitude change detection pulse signal output terminal Q changes to the high level "1" at the time T1, the ASK demodulated output signal Dout of the output logic latch OLL changes from the low level "0" to the high level "1". When the ASK demodulated output signal Dout changes from the low level "0" to the high level "1" at the time T1, the output low-level change prohibit signal Dout_L is set to the low level "0" in the predetermined period between the time T1 and the time T2. In the predetermined period, the ASK demodulated output signal Dout can be prevented from being changed to the low level due to an erroneous operation caused by noise.

It is assumed that the RF signal amplitude value at both ends LA and LB of the antenna coil ANT becomes large and the level of the rectified output voltage Vout becomes high between the time T2 and time T3 by ASK modulation from the card reader/card writer to the RFID card. At the time T2, a voltage supplied from one end of the resistor R6 of the high-pass filter HPF to the first signal input terminal Vin1 of the decoder "Decoder" largely increases. On the other hand, a voltage supplied from the other end of the resistor R6 to the second signal input terminal Vin1 of the decoder "Decoder" slightly increases. As a result, the pull-up capability of the amplitude change detection pulse signal output terminal /Q becomes higher than the pull-down capability of the output terminal /Q, and the output terminal /Q changes to the high level. Immediately before the time T2, the ASK demodulated output signal Dout of the output logic latch OLL is maintained at the high level "1", and the output high-level change prohibit signal Dout_H and the output low-level change prohibit signal Dout_L are maintained at the high level "1". When the amplitude change detection pulse signal output terminal /Q changes to the high level "1" at the time T2, the ASK demodulated output signal Dout of the output logic latch OLL changes from the high level "1" to the low level "0". When the ASK demodulated output signal Dout changes from the high level "1" to the low level "0" at the time T2, the output high-level change prohibit signal Dout_H is set to the low level "0" in the predetermined period between the time T2 and the time T3. In the predetermined period, the ASK demodulated output signal Dout can be prevented from being changed to the high level due to an erroneous operation caused by noise. As described above, the level modulation Dmod of the rectified output voltage Vout by ASK modulation from the card reader/card writer to the RFID card can be ASK demodulated by the ASK demodulator shown in FIG. 6.

Although the present invention achieved by the inventors herein has been concretely described on the basis of the embodiment, obviously, the invention is not limited to the embodiment but can be variously modified without departing from the gist.

For example, the rectifying circuit of the IC chip in the RF secure microcontroller is not limited to the full-wave rectifying circuit but may be a half-wave rectifying circuit.

FIG. 8 is a diagram showing the configuration of an IC chip of an RF secure microcontroller as another embodiment of the invention using a half-wave rectifying circuit.

The IC chip of the RF secure microcontroller shown in FIG. 8 is obtained by having only the rectifying device D1 of the full-wave rectifying circuit in the IC chip of FIG. 3 and eliminating the second switched capacitor SC2 in FIG. 3. By the rectifying operation of the first switched capacitor SC1, the power source voltage Vdd supplied to the central processing unit CPU and the nonvolatile memory unit NVMU by the rectifying operation performed only by the first switched capacitor SC1 is generated. The ASK modulation to be detected by the card reader/card writer is performed by switching between the increase in the current driving performance and stop of the increase in the current driving performance only by the first switched capacitor SC1.

The IC chip of the RF secure microcontroller of the embodiment can be mounted not only on the RFID card but also on a cellular phone used for an automatic ticket gate system and electronic money settlement. In this case, power is supplied to the IC chip from, not the antenna coil of the card but the transmission/reception antenna of the cellular phone.

What is claimed is:

1. A semiconductor integrated circuit comprising:
   a rectifying circuit comprising a first input terminal, a second input terminal, a first output terminal and a second output terminal;
   a switched capacitor;
   a switched-capacitor drive circuit;
   a demodulator; and
   an internal circuit,
   wherein the first input terminal and the second input terminal are electrically coupled to one end and another end of an external antenna, respectively,
   wherein the first output terminal is electrically coupled with the switched capacitor, and the second output terminal is electrically coupled with a ground,
   wherein an RF reception signal from a reader/writer is supplied to the first input terminal and the second input terminal of the rectifying circuit,
   wherein an output rectified voltage outputted from the first output terminal of the rectifying circuit is supplied to the switched capacitor,
   wherein the switched-capacitor drive circuit generates a switch control signal responding to the RF reception signal to drive the switched capacitor by the switch control signal,
   wherein the demodulator demodulates a modulated signal included in the RF reception signal to generate a demodulation signal and supplies the generated demodulation signal to the internal circuit, and
   wherein, by executing series charging to a plurality of capacitors using the output rectified voltage supplied from the rectifying circuit and parallel discharging from the capacitors in response to the switch control signal from the switched-capacitor drive circuit, current driving performance of the switched capacitor at the time of supplying a power source voltage to the demodulator and the internal circuit is set to a predetermined level.

2. The semiconductor integrated circuit according to claim 1, further comprising a switched-capacitor current driving performance increase disable circuit,
   wherein the internal circuit generates transmission signal data and supplies the transmission signal data to the switched-capacitor current driving performance increase disable circuit, and
   wherein, in response to the transmission signal data, the switched-capacitor current driving performance increase disable circuit controls the current driving performance at the time of supplying the power source voltage of the switched capacitor to be lower than the predetermined level.

3. The semiconductor integrated circuit according to claim 2, wherein the switched capacitor includes first and second switched capacitors for alternately parallel-executing capacitor charging and capacitor discharging.

4. The semiconductor integrated circuit according to claim 3, wherein the rectifying circuit is a full-wave rectifying circuit to which a pair of RF reception signals of opposite polarities from the reader/writer are supplied.

5. The semiconductor integrated circuit according to claim 3,
   wherein the demodulator includes a low-pass filter, a high-pass filter, a decoder, and an output logic latch,
   wherein the output rectified voltage from the full-wave rectifying circuit is supplied to an input of the low-pass filter in the demodulator,
   wherein an output signal of the low-pass filter is supplied to an input of the high-pass filter,
   wherein the decoder outputs a discriminative output signal indicative of a magnitude relation between voltages at both ends of an output resistor in the low-pass filter, and
   wherein the output logic latch generates a demodulated output signal in response to the discriminate output signal from the decoder.

6. A card comprising:
   an antenna to which an RF reception signal from a reader/writer is supplied and which transmits an RF transmission signal to the reader/writer; and
   a semiconductor integrated circuit,
   wherein the semiconductor integrated circuit comprises a rectifying circuit, a switched capacitor, a switched-capacitor drive circuit, a demodulator, and an internal circuit,
   wherein the rectifying circuit comprises a first input terminal, a second input terminal, a first output terminal and a second output terminal,
   wherein the first input terminal and the second input terminal are electrically coupled to one end and another end of an external antenna, respectively,
   wherein the first output terminal is electrically coupled with the switched capacitor, and the second output terminal is electrically coupled with a ground,
   wherein the RF reception signal from the antenna is supplied to the first input terminal and the second input terminal of the rectifying circuit,
   wherein an output rectified voltage outputted from the first output terminal of the rectifying circuit is supplied to the switched capacitor,
   wherein the switched-capacitor drive circuit generates a switch control signal responding to the RF reception signal to drive the switched capacitor by the switch control signal,
   wherein the demodulator demodulates a modulated signal included in the RF reception signal to generate a demodulation signal and supplies the generated demodulation signal to the internal circuit, and
   wherein, by executing series charging to a plurality of capacitors using the output rectified voltage supplied from the rectifying circuit and parallel discharging from the capacitors in response to the switch control signal from the switched-capacitor drive circuit, current driving performance of the switched capacitor at the time of supplying a power source voltage to the demodulator and the internal circuit is set to a predetermined level.

7. The card according to claim 6,
   wherein the semiconductor integrated circuit further comprises a switched-capacitor current driving performance increase disable circuit, wherein the internal circuit generates transmission signal data and supplies the transmission signal data to the switched-capacitor current driving performance increase disable circuit, and wherein, in response to the transmission signal data, the switched-capacitor current driving performance increase disable circuit controls the current driving performance at the time of supplying the power source voltage of the switched capacitor to be lower than the predetermined state.

8. The card according to claim 7, wherein the switched capacitor includes first and second switched capacitors for alternately parallel-executing capacitor charging and capacitor discharging.

9. The card according to claim 8, wherein the rectifying circuit is a full-wave rectifying circuit to which a pair of RF reception signals of opposite polarities from the reader/writer are supplied.

10. The card according to claim 8, wherein the demodulator includes a low-pass filter, a high-pass filter, a decoder, and an output logic latch, wherein the output rectified voltage from the full-wave rectifying circuit is supplied to an input of the low-pass filter in the demodulator, wherein an output signal of the low-pass filter is supplied to an input of the high-pass filter, wherein the decoder outputs a discriminative output signal indicative of a magnitude relation between voltages at both ends of an output resistor in the low-pass filter, and wherein the output logic latch generates a demodulated output signal in response to the discriminate output signal from the decoder.

11. A method of operating a semiconductor integrated circuit comprising a preparation step of preparing a semiconductor integrated circuit and an antenna, wherein the antenna receives an RF reception signal from a reader/writer and transmits an RF transmission signal to the reader/writer, wherein the semiconductor integrated circuit comprises a rectifying circuit, a switched capacitor, a switched-capacitor drive circuit, a demodulator, and an internal circuit, wherein the rectifying circuit comprises a first input terminal, a second input terminal, a first output terminal and a second output terminal, wherein the first input terminal and the second input terminal are electrically coupled to one end and another other end of an external antenna, respectively, wherein the first output terminal is electrically coupled with the switched capacitor, and the second output terminal is electrically coupled with a ground, wherein the RF reception signal from the antenna can be supplied to the first input terminal and the second input terminal of the rectifying circuit, wherein an output rectified voltage outputted from the first output terminal of the rectifying circuit can be supplied to the switched capacitor, wherein the switched-capacitor drive circuit generates a switch control signal responding to the RF reception signal in the antenna and can drive the switched capacitor by the switch control signal, wherein the demodulator can supply a demodulation signal generated by demodulating a modulated signal included in the RF reception signal to the internal circuit, wherein the method includes a coupling step of coupling the semiconductor integrated circuit and the antenna, and wherein by executing series charging to a plurality of capacitors using the output rectified voltage supplied from the rectifying circuit and parallel discharging from the capacitors in response to the switch control signal from the switched-capacitor drive circuit responding to the RF reception signal in the antenna, current driving performance of the switched capacitor at the time of supplying a power source voltage to the demodulator and the internal circuit is set to a predetermined level.

12. The method of operating a semiconductor integrated circuit according to claim 11, further comprising a changing step of changing the current driving performance at the time of supplying the power source voltage of the switched capacitor to be lower than the predetermined level.

* * * * *